US007337291B2

(12) United States Patent
Abadi et al.

(10) Patent No.: US 7,337,291 B2
(45) Date of Patent: Feb. 26, 2008

(54) SOFTWARE MEMORY ACCESS CONTROL

(75) Inventors: Martin Abadi, Palo Alto, CA (US); Ulfar Erlingsson, San Francisco, CA (US); Jay A. Ligatti, Princeton, NJ (US); Mihai-Dan Budiu, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/036,801

(22) Filed: Jan. 14, 2005

(65) Prior Publication Data

US 2006/0174077 A1 Aug. 3, 2006

(51) Int. Cl.
*G06F 12/14* (2006.01)
*G06F 13/00* (2006.01)
(52) U.S. Cl. .................. 711/163; 711/100; 711/154
(58) Field of Classification Search ............... 711/163, 711/100, 154
See application file for complete search history.

(56) References Cited

U.S. PATENT DOCUMENTS

| | | | | |
|---|---|---|---|---|
| 4,442,484 | A * | 4/1984 | Childs et al. ............... 711/163 |
| 5,625,836 | A * | 4/1997 | Barker et al. ............... 709/214 |
| 5,761,477 | A | 6/1998 | Wahbe et al. ............... 395/406 |
| 6,151,618 | A | 11/2000 | Wahbe et al. .................. 709/1 |
| 6,397,379 | B1 * | 5/2002 | Yates et al. ................. 717/140 |
| 2002/0138637 | A1 * | 9/2002 | Suzuoki et al. ............. 709/230 |
| 2004/0024953 | A1 * | 2/2004 | Babaian et al. ................ 711/6 |
| 2004/0133777 | A1 * | 7/2004 | Kiriansky et al. .......... 713/166 |

OTHER PUBLICATIONS

"Policy Enforcement for Complex Digital Objects: Background". Information Integrity in Distributed Libraries. Modified Mar. 6, 2001. Accessed Nov. 14, 2006. 2 pages. http://web.archive.org/web/20010306113425/http://www.cs.cornell.edu/payette/prism/security/peBackground.htm.*
"Policy Enforcement for Complex Digital Objects: Current Research". Information Integrity in Distributed Libraries. Modified Mar. 6, 2001. Accessed Nov. 14, 2006. 3 pages. http://web.archive.org/web/20010308220831/http://www.cs.cornell.edu/payette/prism/security/policy.htm.*
Schneider, Fred; Myers, Andrew. "Containment and Integrity for Mobile Code". Status Report to DARPA ISO. Modified Feb. 2000, Accessed Nov. 14, 2006. 20 pages.*
Lopriore, Lafranco. "Access Control Mechanism in a Distributed, Persistent Memory System". IEEE Transactions on Parallel and Distributed Systems. Oct. 2002. pp. 1066-1083.*
Anderson, James. "Computer Security Technology Planning Study". HQ Electronics Systems Division (AFSC). Oct. 1972. pp. 12-19, 58-65.*

(Continued)

*Primary Examiner*—Tuan V. Thai
(74) *Attorney, Agent, or Firm*—Woodcock Washburn LLP

(57) ABSTRACT

Software memory access control is provided by associating instruction areas with memory areas such that instruction areas are not permitted to access memory areas with which they are not associated. Checks may be inserted in the instruction areas to ensure that data provided by a memory group is provided by an associated memory area. Additionally, control flow integrity for the instruction areas may be provided by embedding identifying bit patterns within computed control flow instructions contained in the instruction groups. In this way, control flow of the instruction areas may be provided, thus preventing diversion of control flow and minimizing required checks.

20 Claims, 6 Drawing Sheets

OTHER PUBLICATIONS

Abadi, M. et al, "Control-Flow Integrity: Principles, Implementations, and Applications", University of California, Santa, Cruz, Microsoft Research, Silicon Valley, Princeton University, Oct. 26, 2004, 24 pages.

Avijit, K. et al., "TIED, LibsafePlus: Tools for Runtime Buffer Overflow Protection", *Proceedings of the 13th USENIX Security Symposium*, Aug. 9-13, 2004, San Diego, CA, USA, 12 pages.

Baratloo, A. et al., "Transparent Run-Time Defense Against Stack Smashing Attacks", *Proceedings of the 2000 USENIX Annual Technical Conference*, Jun. 18-23, 2000, San Diego, California, 13 pages.

Bhatkar, S. et al., "Address Obfuscation: An Efficient Approach to Combat a Broad Range of Memory Error Exploits", *Proceedings of the 12th USENIX Security Symposium*, Aug. 4-8, 2003, 105-120.

Brumley, D. et al., "Remote Timing Attacks are Practical", *Proceedings of the 12th USENIX Security Symposium*, Aug. 4-8, 2003, 1-13.

Chew, M. et al., "Mitigating Buffer Overflows by Operating System Randomization", Fall 1999 @ UC Berkeley, 1-9.

Cowan, C. et al., "PointGuard™: Protecting Pointers from Buffer Overflow Vulnerabilities", *Proceedings of the 12th USENIX Security Symposium*, Aug. 4-8, 2003, 91-104.

Cowan, C. et al., "FormatGuard: Automatic Protection from printf Format String Vulnerabilities", *Proceedings of the 10th USENIX Security Symposium*, Aug. 13-17, 2001, 10 pages.

Crandall, J.R. et al., "Minos: Control Data Attack Prevention Orthogonal to Memory Model", *37th International Symposium on Microarchitecture*, 12 pages, no date.

Drinic', M. et al., "A Hardware-Software Platform for Intrusion Prevention", 10 pages, no date.

Feng, H.H. et al., "Anomaly Detection Using Call Stack Information", *Department of Electrical and Computer Engineering, College of Computing*, 14 pages, no date.

Frantzen, M. et al., "StackGhost: Hardware Facilitated Stack Protection", *CERIAS, Engineering Computer Network*, 11 pages, no date.

Kiriansky, V. et al., "Execution Model Enforcement Via Program Shepherding", *Laboratory for Computer Science*, 10 pages, no date.

Kiriansky, V. et al., "Secure Execution Via Program Shepherding", *Proceedings of the 11th USENIX Security Symposium*, Aug. 5-9, 2002, San Francisco, CA., 17 pages.

Kiriansky, V.L., "Secure Execution Environment via Program Shepherding", *Submitted to the Department of Electrical Engineering and Computer Science*, Feb. 4, 2003, 1-82.

Kirovski, D. et al., "Enabling Trusted Software Integrity", *ASPLOS*, 2002, 1-13.

Larochelle, D. et al. "Statically Detecting Likely Buffer Overflow Vulnerabilities", *University of Virginia, Department of Computer Science*, 13 pages, no date.

Larson, E. et al., "High Coverage Detection of Input-Related Security Faults", *Proceedings of the 12th USENIX Security Symposium*, Aug. 4-8, 2003, Washington, D.C., 121-136.

McCamant, S. "Verifiable Binary Sandboxing for a CISC Architecture", May 14, 2004, 14 pages.

Nebenzahl, D. et al., "Install-time Vaccination of Windows Executables to Defend Against Stack Smashing Attacks", *Technical Report EES2003-9, School of Electrical Engineering*, Nov. 4, 2003, 17 pages.

Oplinger, J. et al., "Enhancing Software Reliability with Speculative Threads", *ACM*, 2002, 13 pages.

Pincus, J. et al., "Mitigations for Low-Level Coding Vulnerabilities: Incomparability and Limitations", *Microsoft Research*, Jan. 29, 2004, 1-12.

Pincus, J. et al., "Beyond Stack Smashing: Recent Advances in Exploiting Buffer Overruns", *IEEE Computer Society*, 2004, 20-27.

Prasad, M. et al., "A Binary Rewriting Defense against Stack based Buffer Overflow Attacks", *SUNY Stony Brook*, 14 pages, no date.

Provos, N., "Improving Host Security with System Call Policies", *Center for Information Technology Integration*, 15 pages, no date.

Provos, N. et al., "Preventing Privilege Escalation", *Proceedings of the 12th USENIX Security Symposium*, Aug. 4-8, 2003, 231-241.

Richarte, G. et al. "Four Different Tricks to Bypass StackShield and StackGuard Protection", *Core Security Technologies*, Apr. 9, 2002-Apr. 24, 2002, 1 thru 26.

Rinard, M. et al. "Enhancing Availability and Security Through Failure-Oblivious Computing", 10 pages, no date.

Ruwase, O. et al., "A Practical Dynamic Buffer Overflow Detector", *National Science Foundation under Grant #0086160*, 11 pages, no date.

Shacham, H. et al., "On the Effectiveness of Address Space Randomization", May 12, 2004, 17 pages.

Suh, G.E. et al., "Secure Program Execution via Dynamic Information Flow Tracking", *Computer Science and Artificial Intelligence Laboratory(CSAIL)*, 14 pages, no date.

Tabatabai, A.R.A., et al., "Efficient and Language-Independent Mobile Programs", *Proceedings of PLDI, ACM SIGPLAN Conference on Programming Language Design and Implementation*, 1996, 10 pages.

Tuck, N. et al., "Hardware and Binary Modification Support for Code Pointer Protection from Buffer Overflow", *Proceedings of the 37th International Symposium on Microarchitecture*, Dec. 2004, 12 pages.

Vachharajani, N. et al., "RIFLE: An Architectural Framework for User-Centric Information-Flow Security", *Departments of Computer Science and Electrical Engineering*, Princeton University, 1-12, no date.

Wagner, D. et al., "Mimicry Attacks on Host-Based Intrusion Detection Systems", *CCS*, 2002, 10 pages.

Wagner, D. et al., "Intrusion Detection via Static Analysis", 13 pages, no date.

Wagner, D. et al., "A First Step Towards Automated Detection of Buffer Overrun Vulnerabilities", *University of California, Berkeley*, 15 pages, no date.

Wahbe, R. et al., "Efficient Software-Based Fault Isolation", *Proceedings of the Symposium on Operating System Principles*, 1993, 14 pages.

Wilander, J. et al., "A Comparison of Publicly Available Tools for Dynamic Buffer Overflow Prevention", *10th Network and Distributed System Security Symposium*, 2003, 14 pages.

Xu, J. et al., "Transparent Runtime Randomization for Security", *Center for Reliable and High-Performance Computing Coordinated Science Laboratory*, 10 pages, no date.

"Towards a Solid Base for Dealing with the Next 500 Advanced Code Injection Attacks on C and C++ Programs", 8 pages, no date.

Oh, N. et al., "Control-Flow Checking by Software Signatures", *IEEE Transactions on Reliability*, Mar. 2002, 51(2), 111-122.

Reis, G.A. et al., "SWIFT: Software Implemented Fault Tolerance", http://liberty.princeton.edu/Publications/, Mar. 2005, 12 pages.

Venkatasubramanian, R. et al., "Low-Cost On-Line Fault Detection Using Control Flow Assertions", *Proceedings of the 9th IEEE International On-LineTesting Symposium*, 2003, 7 pages.

Abadi, M. et al., "Asgard: Software Guards for System Address Spaces", Work done at Microsoft Research, Silicon Valley, 14 pages.

De Sutter, B. et al., "Link-Time Binary Rewriting Techniques for Program Compaction", *ACM Transactions on Programming Languages and Systems*, Sep. 2005, 27(5), 882-945.

Necula, G.C. et al., "Safe Kernel Extensions Without Run-Time Checking", *Proceedings of the Second Symposium on Operating Systems Design and Implementation*, 1996, 229-243.

Necula, G.C., "Proof-Carrying Code", Proceedings of the 24th *Annual ACM SIGPLAN-SIGACT Symposium on Principles of Programming Languages*, 1997, 14 pages.

* cited by examiner

510

500

SOFTWARE MEMORY ACCESS CONTROL

CROSS-REFERENCE TO RELATED APPLICATIONS

This application is related to U.S. patent application Ser. No. 11/036,121, entitled "Software Security Based On Control Flow Integrity" filed herewith and incorporated by reference in its entirety.

FIELD OF THE INVENTION

The invention generally relates to computing systems and more specifically to protecting computers in such systems from attacks.

BACKGROUND OF THE INVENTION

Traditional hardware approaches for protecting data memory partition the memory so that a memory area used for one application may be inaccessible to another application. This approach has been implemented by software that partitions memory as well. The partitioning software may provide broad memory partitions similar to the traditional hardware approach. Additionally, the partitioning software may provide partitions of memory within an application. That is, if a software application has ten broad instruction groups, then the partitioning software may prevent memory associated with a first instruction group to be accessed by a second instruction group. Additionally, such partitioning software may enforce policies such as a first region of memory is only executable, while a second region may be written to or read.

A problem associated the partitioning software, however, is that it may provide only coarse, simplistic control for memory protection. It may implement an assumption that the same security policies used in hardware for memory access should apply broadly in software. For example, it may not allow different security policies to be applied to pieces of data memory that are smaller than the broad memory partitions associated with typical partitioning approaches. It also may not apply security policies that depend on individual code instructions. Additionally, the partitioning software may require checks to be inserted throughout a function to ensure that the partitioning is in effect even in the event of unusual or unexpected flows of control (including those that possibly may be caused by an attacker). For example, a check may be performed before a read operation, then the read operation may be completed, and then a second check may be performed before a write operation is performed. The second check may be needed if it cannot be determined that control flow can reach the write operation only after having gone through the check associated with the read operation. This is a cumbersome process that greatly reduces the practical value of such partitioning software.

Therefore, there is a need for memory access control that provides a higher degree of control over the policies implemented for data memory access. There is also a need for the memory access control to ensure control flow integrity without necessitating cumbersome verification.

SUMMARY OF THE INVENTION

The invention provides software memory access control (SMAC) that may allow for a higher degree of control over policies implemented for data access. Additionally, implementation of certain control flow integrity techniques may enable SMAC implementation without requiring cumbersome control flow verification coding to be added throughout software.

The invention may include dividing computer memory into areas and then linking, that is, associating, memory areas with those program instruction areas that are expected to access the memory areas. The instruction areas may have access to only those memory areas with which they are associated. Moreover, different modes of access, such as "read," "write," and "execute" may be distinguished, and a particular instruction area may have only certain kinds of access to each memory area. In this way, if an attacker alters an instruction area such that the instruction area attempts to access an unassociated memory area, the access will not be allowed.

Additionally, control flow instrumentation may insert randomly chosen, unique identifying bit patterns at computed control flow instruction locations identified by a control flow graph. Such bit patterns may provide an assurance that the control flow of the software instruction areas is executed in an anticipated manner, consistent with the control flow graph. In this way, control flow of an instruction area may not be diverted unexpectedly. Therefore, memory areas may only be accessed by associated instruction areas.

BRIEF DESCRIPTION OF THE DRAWINGS

The foregoing summary, as well as the following detailed description of illustrative embodiments, is better understood when read in conjunction with the appended drawings. For the purpose of illustrating aspects of the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Example Computing Environment

Figure 1:
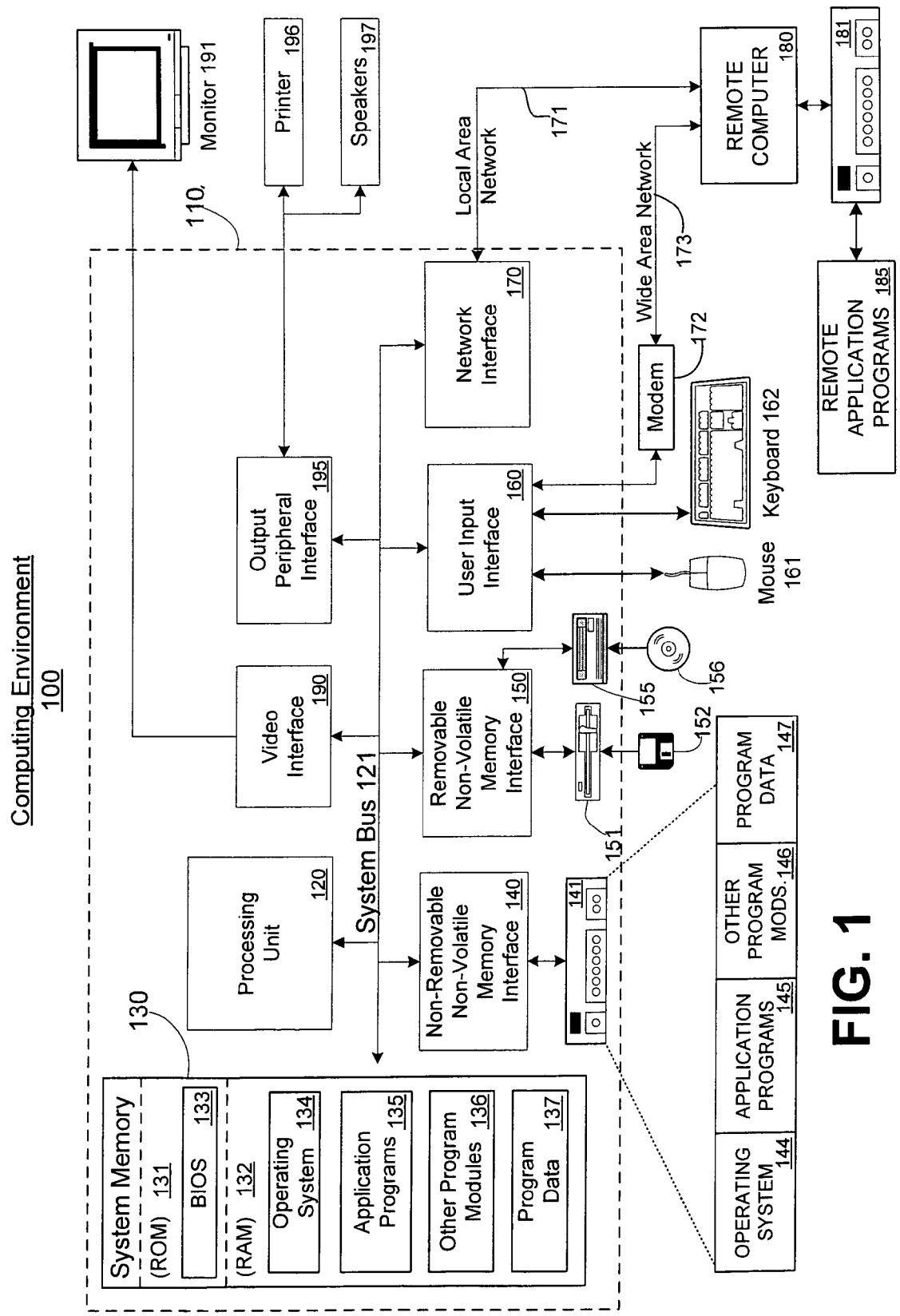
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2:
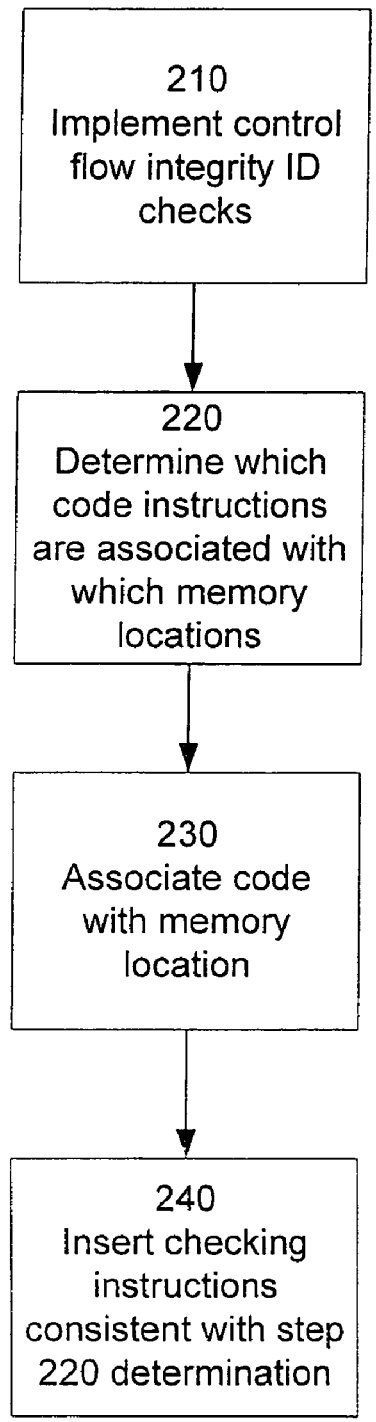
FIG. 2 is a flow diagram of an example method for software memory access control according to the invention.

FIG. 2 is a block diagram of an example method 200 for software memory access control (SMAC) according to the invention. SMAC may allow different code instructions, threads, programs, etc., access to different memory regions. SMAC may separate code and data regions of memory, and implement separate policies on each (e.g., non-executable data, non-writable code, disallowing reading of code, combination thereof, etc.). SMAC may allow data used by an area of code to be inaccessible except to that area of code. Additionally, SMAC may help ensure that the area of code cannot be affected by the contents of other memory. SMAC therefore may, for example, generalize the use of registers in the instrumentation sequences that enforce security policies as Inlined Reference Monitors, such as is done in control flow integrity techniques disclosed in U.S. patent application Ser. No. 11/036,121, to achieve fundamental control flow graph constraints.

The method may begin at step 210 with the implementation of control flow integrity in a software program. As described in U.S. patent application Ser. No. 11/036,121, control flow integrity may provide that during software program execution, control flow machine code instructions target a valid destination. The validity of the destination may be determined by reference to a control flow graph created ahead of time pursuant to a control flow analysis. A unique identifying bit pattern, or ID, may be inserted at the start of each equivalent destination. Two destinations may be equivalent if the control flow graph contains edges to both from a single source, and two sources may be equivalent if, in the control flow graph, they both target the same destination. Finally, control flow integrity instrumentation may insert before all equivalent sources the code for an ID-check. This ID-check may be a dynamic check that helps ensure that a runtime destination starts with an ID of a proper equivalence class.

At step 220, a software program may be evaluated to determine which code instruction areas, threads, etc., are associated with which areas of data memory. For the present purposes, data memory need not be limited to the main memory of the computer; it may include, for example, registers, any special memory buffers, cache memory, disk records, and other primary and secondary storage. This evaluation may also show which code instructions are not associated with which areas of data memory. SMAC may thus compartmentalize memory in such a way to protect it from unanticipated accesses to memory areas by a piece of code. Additionally, because control flow integrity may prevent unanticipated diversion of control flow within the piece of code, the software may be protected from unanticipated memory alterations. For example, a determination may be made that a code instruction will—for all permitted control flow, and therefore for all possible executions—only access a certain memory area in a manner that is consistent with some security policy. For example, a security policy may provide that, during execution of code instruction R requiring a read operation on a certain memory area, the read operation should access a memory area allowed for by the code instruction R.

At step 230, the instruction areas, threads, etc., may be associated with respective memory areas. Continuing the example, the code instruction R may be associated with the memory location from which the read operations will be performed. Additionally, other code instructions may be disassociated from the memory location associated with the code instruction R. This disassociation may be completed either with an explicit prohibition or implicitly by, for example, providing only that the code instruction R is authorized to read the memory location.

At step 240, a checking instruction may be inserted in the code instruction area, thread, etc., to verify, for example, that a return value was provided by an anticipated memory area. In the event that a value is returned from an unanticipated memory area, remedial measures (e.g., notifying the user, stopping the software execution) may commence.

Figure 3:
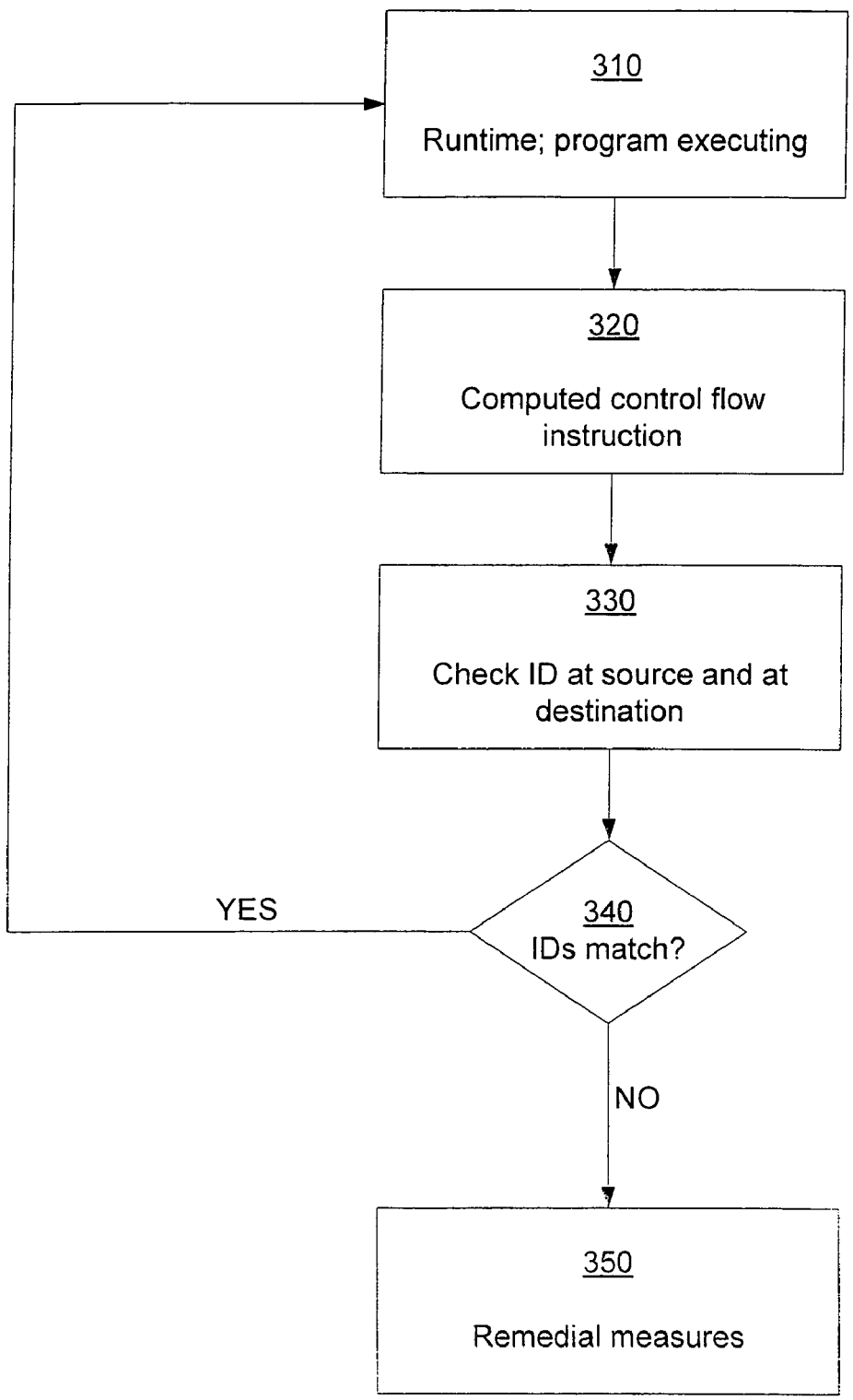
FIG. 3 is a flow diagram of an example method for implementing control flow integrity in furtherance of providing software memory access control according to the invention.

FIG. 3 is a block diagram of an example method 300 for implementing control flow integrity in furtherance of providing SMAC in accordance with an embodiment of the invention. The method 300 may commence at step 310 during runtime of a software program implementing control flow integrity IDs. The software program may be executing and, at step 320, may come to a computed control flow instruction. Such an instruction may be, for example, a computed jump or a call. At step 330, a check of an ID assigned to a source and an ID assigned to a destination of the computed control flow instruction may be completed. At step 340, the IDs of the source and destination may be compared. If the IDs match, then the software program continues execution. If the IDs do not match, then at step 350, predefined remedial measures may be implemented. Such measures may include halting the program, showing an error, modifying behavior, or providing other notifications.

With the implementation of control flow integrity in accordance with a predefined control flow graph, the insertion of checking instructions described with regard to FIG. 2 may be simplified. SMAC may have fewer checks because the control flow integrity IDs may help ensure that the control flow of the software is flowing in an anticipated manner. For example, a code area may include a number of read commands in succession. With control flow integrity implementation, the software may read data in succession desirably without insertion of the checks in between the individual reads. Checks may not be needed because the control flow graph may show that the code area will be performing a number of reads in succession. That is, the control flow graph shows that the control flow of the code area will not be diverted (e.g., reaching one read without going through the corresponding check).

Figure 4:
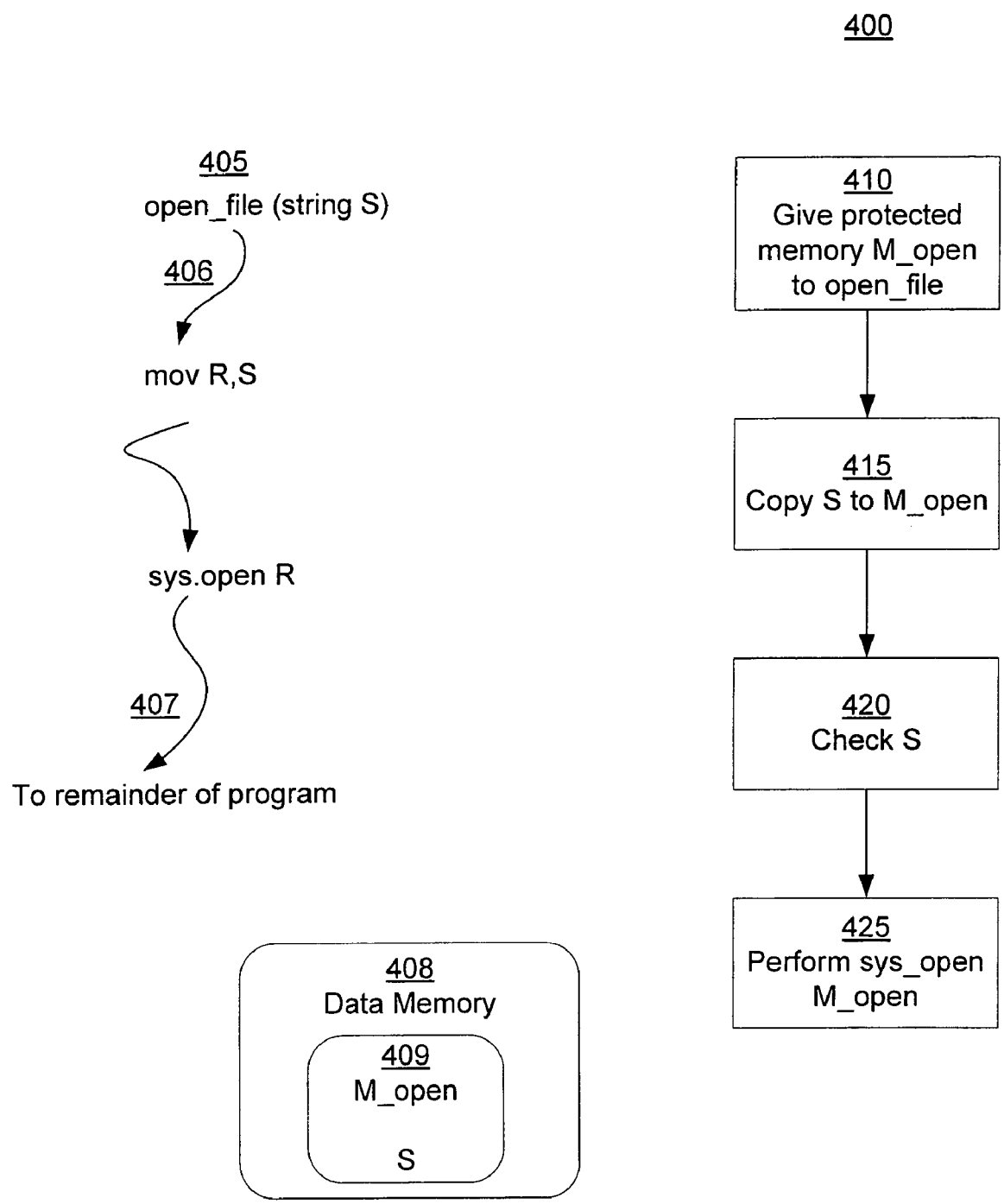
FIG. 4 depicts a flow diagram of an example method for implementing software memory access control according to the invention.

FIG. 4 depicts a block diagram of an example method 400 for implementing SMAC according to the invention. The method 400 may implement SMAC with regard to an instruction area 405 called "open_file" within a program. A control flow of the program may proceed through the program in a direction such as indicated by arrow 406, through the instruction area 405, and on to the rest of the program, as indicated by arrow 407. The control flow of the program at runtime may execute the instruction area 405 to open a file called "S." The file "S" may reside in an area in data memory 408 called M_open 409. Because S resides in data memory 408, there may be no assurance provided by control flow integrity that S may not be attacked. SMAC may provide protection to M_open 409 so that M_open 409 may not be affected (read, written, executed, etc.) by any code except for code inside the "open_file" instruction area 405. That is, coding may be included in the open_file instruction area 405 providing that it may pull data from M_open 409. Additionally, checks may be inserted in other instruction groups, threads, etc., providing that each of them may pull data from memory in areas other than M_open 409. In this way, SMAC may be implemented and M_open 409 may be accessed only by the open_file instruction area 405. Additionally, the open_file instruction area 405 may be protected pursuant to the control flow integrity ID assignments. Those skilled in the art will recognize that any method of implementing control flow integrity may be used in conjunction with various embodiments of the invention, and that the invention is not limited to control flow integrity implemented by ID assignments or by the methods disclosed in U.S. patent application Ser. No. 11/036,121.

At step 410, the file S contained in M_open 409 may be provided. S may be copied from M_open at step 415, and checked at step 420. The check may ensure, for example, that S was provided by M_open 409 and not another source. The check may be completed whenever the open_file instruction area 405 is executed because control flow through the function 405 proceeds in the direction of the arrows 406 and 407, and an attacker may be prevented from changing M_open 409 because it is only accessible under the constraints imposed by the control flow of the program. At step 425, a system call may be completed, and the file S may be opened.

Figure 5:
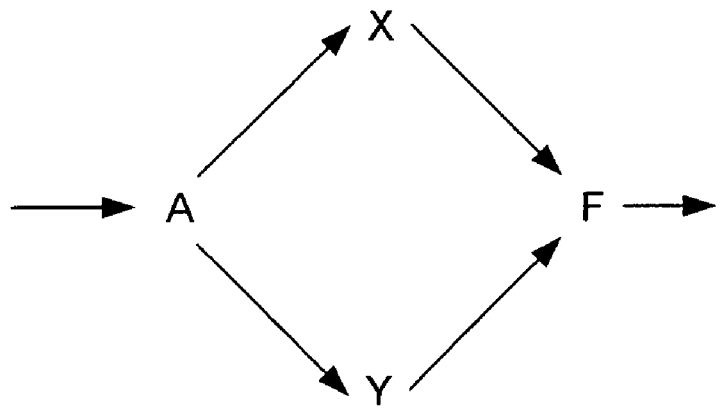
FIG. 5 depicts a flow diagram of an example application of software memory access control to reinforce control flow integrity, according to the invention.
Figure 5:
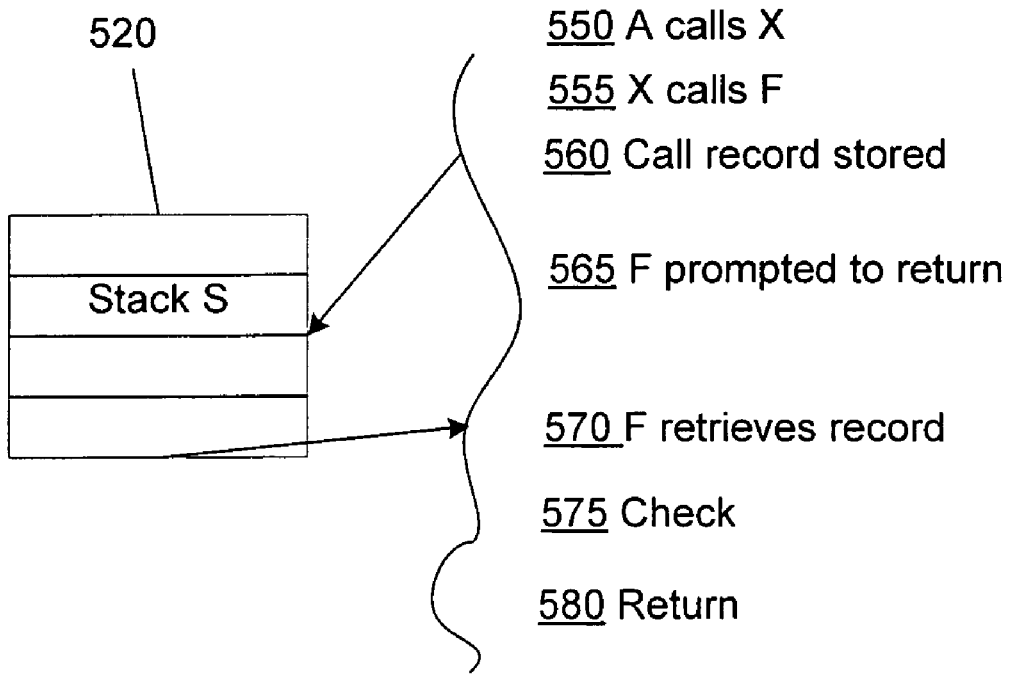

FIG. 5 depicts a flow diagram 500 of an example application of SMAC to reinforcing control flow integrity, according to the invention. A control flow graph 510 shows that the intended control flow for a program proceeds thusly: A calls either X or Y, and A's callee in turn calls F. From F, the control flow continues executing the program code. A, X, Y, and F each represent an instruction, instruction area, thread, etc., that includes a call. There may be return calls. If A calls X and X calls Y, then the return calls may proceed to the caller (e.g., F returns to X, and X returns to A). Machine code, however, may allow F to return to Y instead of X even if a higher level software language would not. Therefore, an attacker may, for example, control the flow so that it proceeds from A to X to F to Y and back to A.

A problem with ensuring that control flow for such calls, for example, follows the control flow graph 510 is that the chosen path (AXF or AYF) may be determined only at runtime. While an extra runtime check may be performed to ensure that the chosen control flow proceeds either through AXF or AYF, in general the runtime check needs to rely on call records that may not be reliable, so it may not provide an assurance that the return will proceed through the correct path. A record may be created for the return call to ensure that, for example, if the path at runtime is AXF, then the return call path is FXA. If an attacker, however, modifies memory, then the return could be set to FYA, contrary to the anticipated return path.

SMAC may be implemented to prevent such an action. The method 500 may commence at step 550 with A calling X. IDs inserted at A and X may be checked to verify that the control flow is anticipated. At step 555, X may call F, and IDs may be checked likewise. At step 560, a record indicating that the call to F was prompted by X may be stored in a memory stack S 520. At step 565, F may be prompted to provide a return call. At step 570, F may retrieve the record from the stack S 520. Other instructions in the program on which the control flow graph 510 is based may explicitly or implicitly contain limitations indicating that stack S 520 is off limits to them. In this way, for example, only F may have access to the stack S 520 and may reliably learn, therefore, that the return call proceeds to X. The instruction area may include a check for verifying that the record was retrieved from stack S at step 570. At step 575, the return from F to X may be completed.

It should be noted that hardware as well as software may partition memory. For example, hardware architecture may divide a hardware memory into areas, such as code areas, data areas, stack areas, etc. Implementing SMAC may associate each respective area with an instruction, a thread, an instruction area or group of instructions, an application, etc. Using control flow integrity techniques (such as inserting IDs at the sources and destinations of computed control flow instructions), and inserting checks that link the instruction, thread, etc., to a memory segment, memory integrity may be preserved against attacks, similar to the software memory model described herein.

Implementation of SMAC may benefit from support by hardware mechanisms, such as page tables or, alternatively, from segments. Page tables or segments may be used, for example, to indicate areas of memory that a thread may access. Two threads may be associated with two different page tables or two different segments, for example, and therefore the threads may be able to access different areas of memory and may be prevented from accessing the memory areas associated with other threads. SMAC may take advantage of page tables and segments because assignments regarding which areas of memory a thread may or may not access may be implemented by application of page tables or by application of segments. Additionally, a function may direct an operating system to change page tables or change segments, providing a different view of memory which may be implemented. The operating system may then be directed to revert to the original page tables or the original segments. Such an attribute may facilitate dynamic code generation, dynamic loading, etc. Those skilled in the art will recognize that embodiments of SMAC may be applied in conjunction with hardware mechanisms for partitioning memory other than page tables or segments.

Because it builds on control-flow integrity, embodiments of SMAC can make use of hardware-supported memory partition by identifying and associating certain hardware-supported memory partitions with certain code instructions in a program. For instance, embodiments of SMAC may ensure, for example, that an instruction area FOO, comprising a function foo( ), only has access to data segment 73 (or some other particular data segment) by a determination that—for all control flow—the immediate integer constant 73 is assigned to the data segment selector at the start of foo( ) and, whenever foo( ) returns or FOO is otherwise exited, the original data segment selector is restored (this restoration can be determined, e.g., statically by identifying a constant "original" selector number, or dynamically by use of a protected memory region such as S 520). In an analogous fashion, an instruction area BAR, comprising the functionality of bar( ), may be associated with certain page tables by identifying that the entry and exit of bar( ) is—in all control flow—coupled with the adoption and subsequent shedding of those particular page tables. Similar to segments, the instructions for page-table use may make use of immediate integer constants that allow for their easy static identification and analysis (e.g., adopting page tables 93 may be done via a specific system call or IOCtl entry into the operating system kernel).

Figure 6:
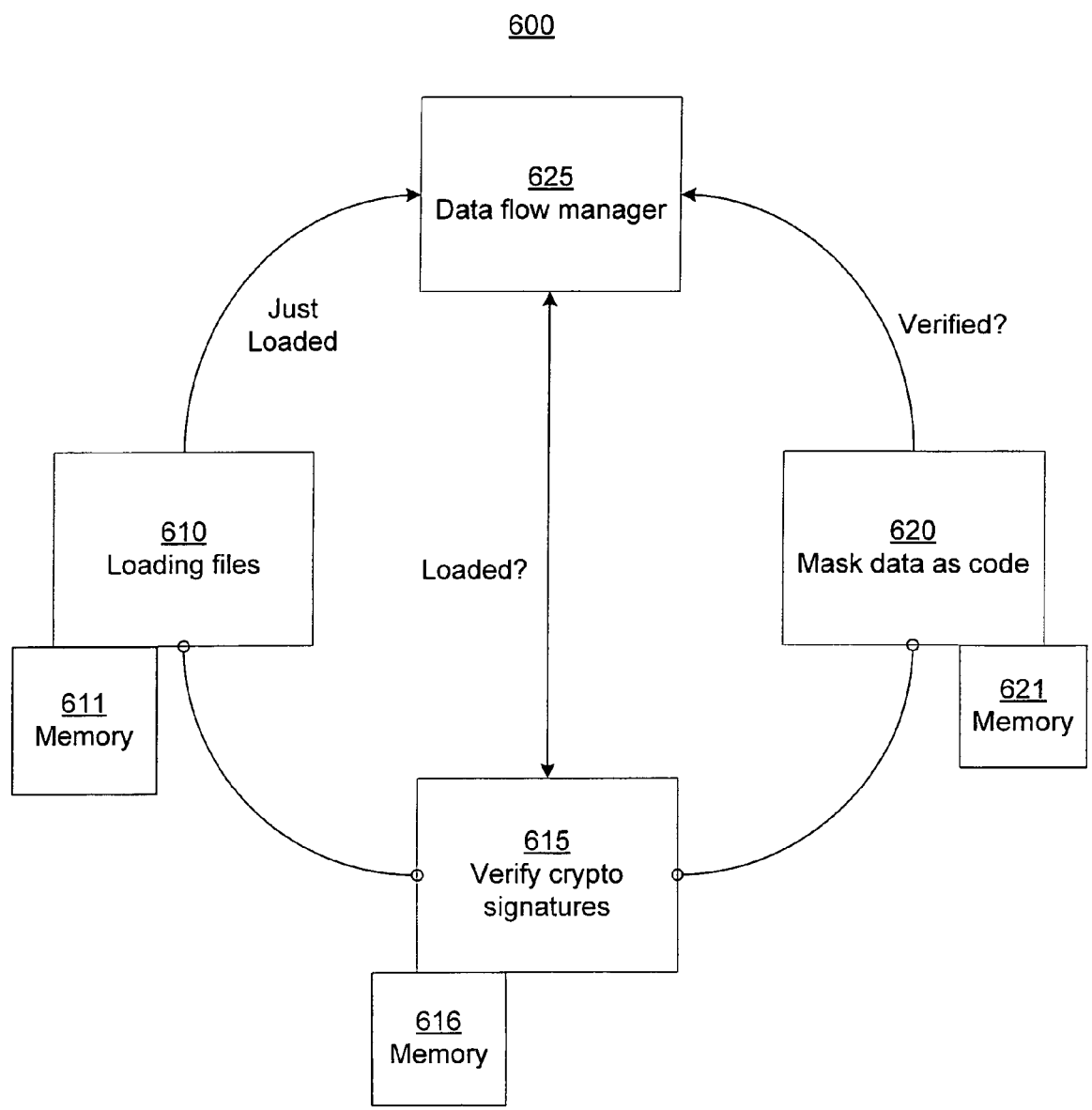
FIG. 6 depicts a block diagram of an example system for implementing software memory access control according to the invention.

FIG. 6 depicts a block diagram of an example system 600 implementing SMAC according to the invention. The system 600 may include an instruction, instruction area, thread, application, etc., such as a loading files instruction area 610. The loading files instruction area 610 may be associated with its own memory area 611. The system 600 may include, for example, a verification entity 615 that verifies cryptographic signatures. The verification entity 615 may be associated with its own memory area 616. A mask entity 620 may be included in the system 600 and may take data and mark it as code. The mask entity 620 may be associated with its own memory area 621, and also may be a target of an attacker because an attacker potentially may access data and change it.

The system 600 may also include a data flow manager 625 which may control the manner in which data (as opposed to control) flows in the system 600. For example, the data flow manager 625 may mandate that the verification entity 615 never accept data unless the data has been generated by the loading files instruction area 610. The loading files instruction area 610 may communicate with the data flow manager 625 regarding when files are loaded with a "just loaded" communication. The verification entity 615 may ask the data flow manager 625 if the files have been loaded with a "loaded?" communication. Thus "loaded?" may be stored on the memory area 616 of the verification manager 615. Likewise, the mask entity 620 may query the data flow manager 625 regarding whether the files have been verified by the verification entity 615 with a "Verified" query stored in its area memory 621. Such a system may enable fine grained SMAC to be implemented, providing a fine degree of control over memory protection.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed is:

1. A method for preventing access to data stored in a computer memory, the computer memory being accessed by a plurality of instruction areas of a software system, the method comprising:

maintaining a plurality of memory areas in the computer memory;

executing a first instruction area;

linking the first instruction area to a first memory area of the plurality of memory areas after executing the first instruction area, wherein the linking is completed at least in part by insertion of a checking instruction in the first instruction area; and disassociating a second instruction area from the first memory area such that the first memory area is inaccessible to the second instruction area.

2. The method of claim 1, further comprising:

enforcing control flow integrity of the software system, wherein the software system comprises software associated with the computer memory, and wherein the control flow integrity is associated with a control flow graph specification.

3. The method of claim 2, wherein enforcing the control flow integrity of the software system enforces a disassociation of the first instruction area from the first memory area in the absence of a memory access check.

4. The method of claim 1, further comprising:

associating a third instruction area with the first memory area, wherein a datum stored in the first memory area is accessible to the third instruction area.

5. The method of claim 4, further comprising:

implementing remedial measures if a datum received by the third instruction area is not stored in the first memory area.

6. The method of claim 4, wherein associating the third instruction area with the first memory area is performed by coding in the first instruction area.

7. The method of claim 4, wherein associating the third instruction area with the first memory area is performed by reference to support from hardware memory partitioning mechanisms.

8. The method of claim 4, wherein the first memory area comprises a call record and wherein the third instruction area comprises a call or return.

9. The method of claim 8, wherein the first memory area comprises a stack of call records, and wherein the third instruction area relies on the stack of call records for enhancing control flow integrity.

10. The method of claim 1, further comprising:

implementing remedial measures if the second instruction area requests access to the first memory area.

11. The method of claim 1, wherein maintaining a plurality of memory areas in the computer memory is performed in software.

12. The method of claim 1, wherein maintaining a plurality of memory areas in the computer memory is performed in hardware.

13. The method of claim 1, wherein the first memory area comprises at least one of main computer memory, registers, special memory buffers, cache memory, and disk records.

14. A computer-readable medium having computer-executable instructions for performing steps, comprising:

maintaining a plurality of memory areas in a computer memory, wherein each memory area comprises a datum; and linking a first instruction area to a first memory area of the plurality of memory areas after execution of the first instruction area commences such that the first memory area is accessible to the first instruction area and is inaccessible to any instruction area to which it is not linked.

15. The computer-readable medium of claim 14, having further computer-executable instructions for performing the steps of:

inserting a check in the first instruction area that verifies that datum received by the first instruction area is received from the first memory area.

16. The computer-readable medium of claim 14, having further computer-executable instructions for performing the step of:

enforcing control flow integrity of the software, wherein the software is associated with the computer memory, and wherein the control flow integrity is associated with a control flow graph specification.

17. A system, implemented at least in part by a computing device, for preventing access to data stored in a computer memory, the computer memory being accessed by a plurality of instruction areas of software, the system comprising:

means for maintaining a plurality of memory areas in the computer memory, wherein each memory area comprises a datum;

means for linking each memory area of the plurality of memory areas to at least one respective instruction area after the at least one respective instruction area commences execution, wherein each memory area is accessible to its linked at least one respective instruction area and is inaccessible to each instruction area to which it is not linked.

18. The system of claim 17, further comprising:

means for inserting a check in a first instruction area that verifies that datum received by the first instruction area is received from an associated memory area.

19. The system of claim 17, further comprising:

a data flow manager that controls the data flow in the system to prevent access to memory areas by unassociated instruction areas.

20. The system of claim 17, further comprising:

means for enforcing control flow integrity of the software, wherein the software is associated with the computer memory, and wherein the control flow integrity is associated with a control flow graph specification.

* * * * *